United States Patent [19]

Locke et al.

[11] Patent Number: 4,692,707

[45] Date of Patent: * Sep. 8, 1987

[54] METHOD AND APPARATUS FOR MEASURING THE EARTH FORMATION RESISTIVITY OF A PLURALITY OF RADIAL REGIONS AROUND A BOREHOLE

[75] Inventors: Stanley Locke; Michel Gouilloud, both of Norwalk, Conn.

[73] Assignee: Schlumberger Technology Corporation, New York, N.Y.

[*] Notice: The portion of the term of this patent subsequent to Jun. 10, 2003 has been disclaimed.

[21] Appl. No.: 511,414

[22] Filed: Jul. 6, 1983

[51] Int. Cl.$^4$ .............................................. G01V 3/20
[52] U.S. Cl. ...................................... 324/374; 324/347
[58] Field of Search ............... 324/366, 367, 373, 374, 324/375, 356, 355, 358, 357; 33/178 F; 73/151, 152, 153; 250/268

[56] References Cited

U.S. PATENT DOCUMENTS

| | | | |
|---|---|---|---|
| 2,669,688 | 2/1954 | Doll | 324/1 |
| 2,712,629 | 7/1955 | Doll | 324/1 |
| 2,754,475 | 7/1956 | Norelius | 324/1 |
| 2,842,735 | 7/1958 | Martin | 324/1 |
| 2,961,600 | 11/1960 | Tanguy | 324/374 |
| 2,965,838 | 12/1960 | Kister | 324/1 |
| 3,060,373 | 10/1962 | Doll | 324/1 |
| 3,132,298 | 5/1964 | Doll et al. | 324/10 |
| 3,166,708 | 1/1965 | Millican | 324/375 X |
| 3,167,707 | 1/1965 | Oliver | 324/347 |
| 3,254,221 | 5/1966 | Saurenman | 250/268 |
| 3,356,146 | 12/1967 | Anderson | 166/241 |
| 3,462,678 | 8/1969 | Eaton | 324/367 |
| 3,521,154 | 7/1970 | Maricelli | 324/10 |
| 3,564,914 | 2/1971 | Desai et al. | 324/367 |
| 3,566,682 | 3/1971 | Winkler, Jr. | 324/367 X |
| 3,601,692 | 8/1971 | Schuster | 324/367 |
| 3,760,260 | 9/1973 | Schuster | 324/10 |
| 3,772,589 | 11/1973 | Scholberg | 324/10 |
| 3,795,141 | 3/1974 | Planche | 73/151 |
| 3,973,188 | 8/1976 | Attali et al. | 324/10 |
| 4,110,682 | 8/1978 | Tabanou | 324/375 |
| 4,117,394 | 9/1978 | Souhaité | 324/374 |
| 4,205,266 | 5/1980 | Lichtenberg | 324/253 |
| 4,243,099 | 1/1981 | Rodgers, Jr. | 166/66.4 |
| 4,251,773 | 2/1981 | Cailliau et al. | 324/347 |
| 4,412,180 | 10/1983 | Desbrandes | 324/373 |
| 4,432,143 | 2/1984 | Moriarty et al. | 33/178 F |
| 4,480,186 | 10/1984 | Wolk | 250/268 |
| 4,588,951 | 5/1986 | Ohmer | 324/374 X |
| 4,594,552 | 6/1986 | Grimaldi et al. | 324/374 X |

*Primary Examiner*—Gerard R. Strecker
*Assistant Examiner*—Warren S. Edmonds
*Attorney, Agent, or Firm*—Peter Y. Lee; Stephen L. Borst; David H. Carroll

[57] ABSTRACT

A wall engaging pad for well logging comprises a face portion of electrically conductive material within which are disposed three or more current electrodes. The survey current emitted from the current electrodes is differently focussed. A suitable current return is furnished. A plurality of individual measurements having respective graduated depths of investigation are obtained and suitably processed to yield resistivity measurements. The body of the sonde carrying the pad may be used to enhance the focussing of the survey current.

14 Claims, 16 Drawing Figures

RADIAL DISTRIBUTION OF RESISTIVITIES
($R_{mf} \gg R_w$, WATER-BEARING BED)

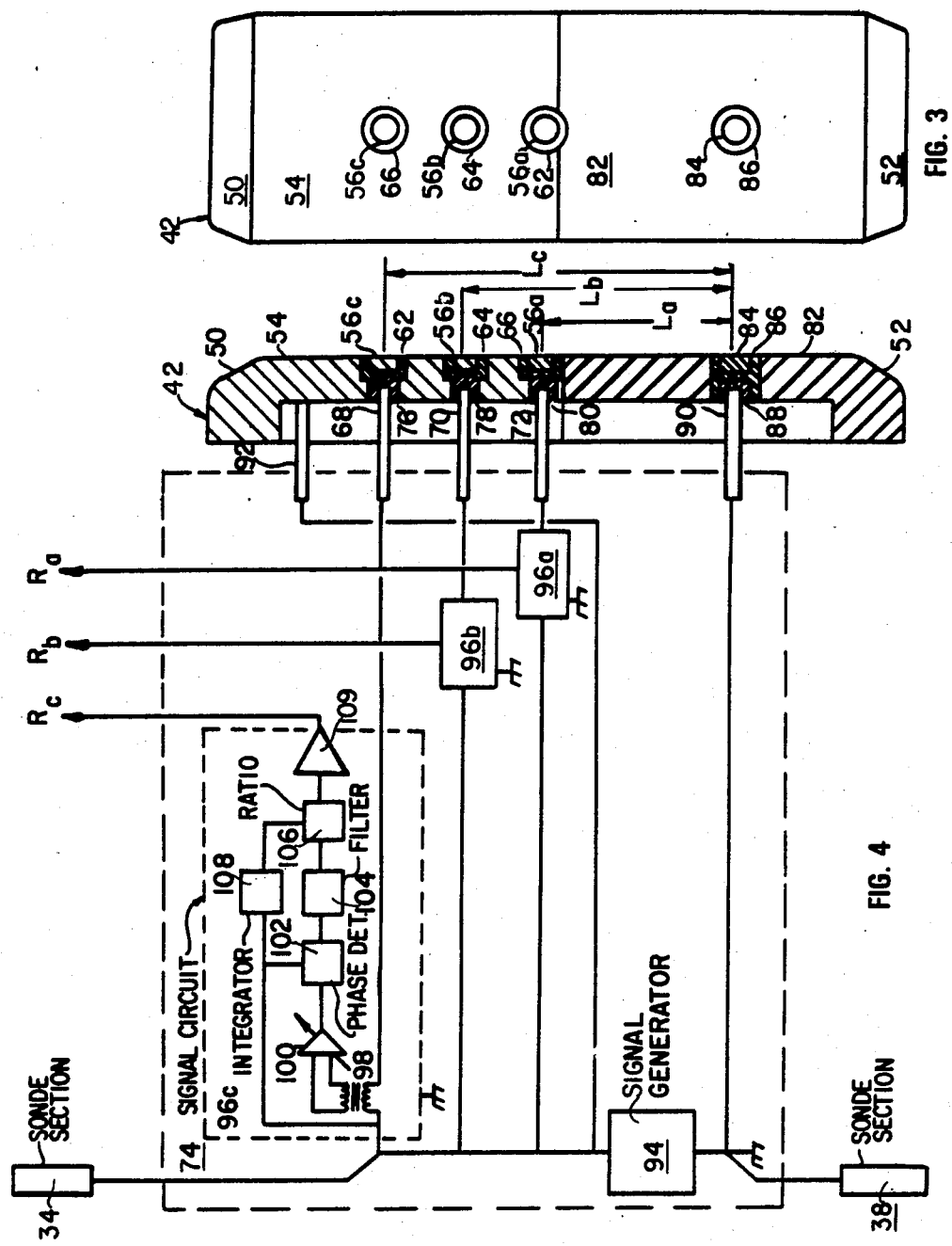

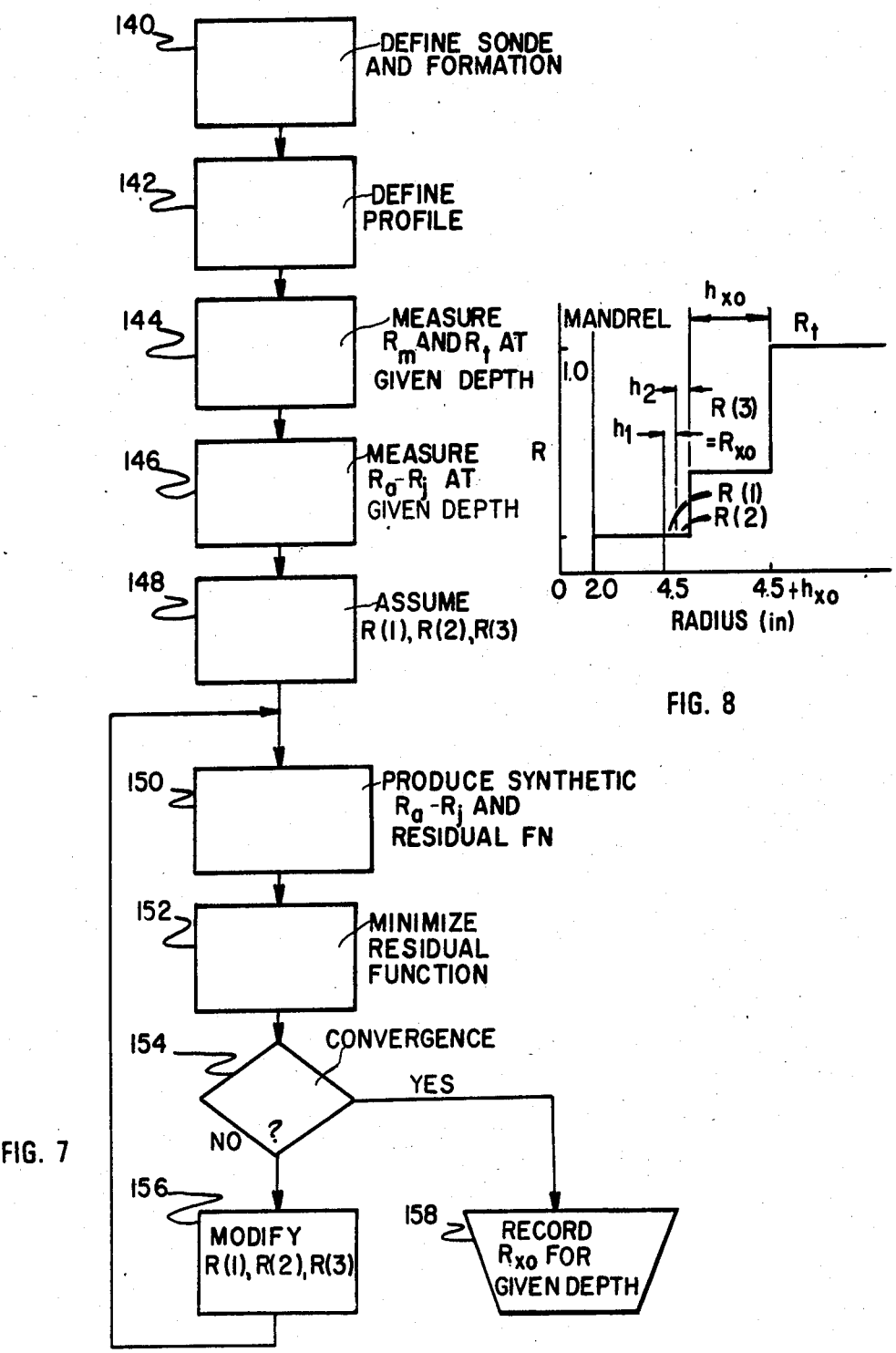

METHOD AND APPARATUS FOR MEASURING THE EARTH FORMATION RESISTIVITY OF A PLURALITY OF RADIAL REGIONS AROUND A BOREHOLE

The subject matter of this application is related to subject matter disclosed in the following copending U.S. patent applications, each filed on even date herewith and assigned to a common assignee: U.S. application Ser. No. 511,412 of H. Ohmer, now U.S. Pat. No. 4,588,951, and U.S. application Ser. No. 511,413 of P. Grimaldi and J. C. Trouiller, now U.S. Pat. No. 4,594,552.

BACKGROUND

The present invention relates generally to the measurement of earth formation resistivity from a borehole traversing the formation, and more specifically to the measurement of the resistivity and/or thickness of one or more regions about the borehole.

In many conventional drilling operations, the mud in the borehole is conditioned so that the hydrostatic pressure of the mud column is greater than the fluid pressure of the formations. The effect of this condition is represented in FIG. 1, which shows an exemplary radial distribution of resistivities in a water-bearing bed.

The differential pressure forces mud filtrate into permeable formations traversed by the borehole, whereby the solid particles of the mud are deposited on the borehole wall to form a mudcake of resistivity $R_{mc}$. This mudcake usually has very low permeability and considerably reduces the rate of infiltration as it builds. In the portion of the formations immediately about the borehole, however, all of the formation water and some of the hydrocarbons, if present, are flushed away by the filtrate. This zone is called the flushed zone, and its resistivity is expressed as $R_{XO}$. Farther out from the borehole the displacement of formation fluids is less and less complete, resulting in a transition zone in which a progressive change in resistivity occurs from $R_{XO}$ to the resistivity of the uninvaded formation, $R_t$. The lateral depth of invasion depends in part on formation permeability and is quite variable, ranging from less than one centimeter to several tens of centimeters.

Measurements of $R_{XO}$ are important for several reasons. When invasion is moderate to deep, knowledge of the $R_{XO}$ value makes possible more accurate determinations of true resistivity $R_t$, which is related to hydrocarbon saturation. Also, some methods for computing saturation are entered with the ratio $R_{XO}/R_t$. Also, in clean formations, a value of the Formation Factor F may be computed from $R_{XO}$ and the resistivity of the mud filtrate '37 $R_{mf}$," if the mud filtrate saturation "$S_{XO}$" is known or estimated. From F, a value for porosity may be found. A more recent application for $R_{XO}$ data is in conjunction with a full evaluation of hydrocarbon effects on the Neutron and Density logs, an integral part of the SARABAND ™ and CORIBAND ™ services available through Schlumberger Technology Corporation, Houston, TX. Moreover, the comparison of $R_{XO}$ and $R_t$ is useful for understanding hydrocarbon moveability.

In addition to recognizing the usefulness of the $R_{XO}$ measurement, the prior art has been concerned with acquiring information that is indicative of the locations of lateral discontinuities in electrical resistivities of borehole surrounding materials to determine well borehole diameter and depth of fluid invasion. U.S. Pat. No. 2,754,475 (stated inventor: Norelius; issued July 10, 1956), for example, discloses that resistivity measurements may be made at continuously varying lateral depths in the borehole and formation surrounding the borehole by measuring throughout a plurality of borehole locations the average resistivity of formation and borehole fluid contained within respective spherical shells. The shells are established by an electrical field that converges substantially radially through surrounding formations upon an input electrode in the fluid within the well borehole. The borehole radius, depth of invasion, and the location of the uninvaded formation can be determined by identifying any discontinuities which appear in a display.

It has been recognized in the art that a wall-engaging pad device is most appropriate for the measurement of shallow invasion, however. Many such devices have been proposed, one of which is disclosed in U.S. Pat. No. 2,669,688 (Doll, Feb. 16, 1954). One of the embodiments described in the Doll '688 patent includes a three electrode system comprising a current electrode and two potential measuring electrodes, with the current return being on the cable. Measurements made with this system are indicative of the resistivities at different shallow lateral depths of investigation. One depth of investigation is approximately equal to the probable thickness of mudcake on the wall of the borehole, and the other is slightly greater so as to include the mudcake and at least a part of the adjacent portion of the formation that has been invaded by the mud filtrate. Since the presence of mudcake on the wall of a borehole is an indication of invasion of the formation by mud filtrate, proper interpretation of the measurements so made enables permeable formations to be identified. A third measurement at yet another shallow lateral depth of investigation also facilitates the identification of permeable formations. See, e.g., U.S. Pat. No. 2,965,838 (Kister, Dec. 20, 1960).

To accurately measure the value of $R_{XO}$, however, the measurement must not be affected by the borehole or must be capable of being corrected. Measurements made at different shallow lateral depths of investigation can be corrected when at least one of the measurements accurately yields mudcake resistivity. See, e.g., the Kister patent. Borehole effects on the $R_{XO}$ measurements can be minimized, however, by the use of focussing currents to control the path taken by the survey current. Borehole effects, particularly severe as the mudcake thickness increases, arise when the survey current is shunted back to the borehole by the relatively low resistance path formed by the mudcake so that the formation measurement is influenced to a large extent by the mudcake resistivity. Several apparatus have been proposed to overcome this problem. The focussed pad system disclosed in U.S. Pat. No. 2,712,629 (Doll, July 5, 1955) is particularly suitable for use where a minimum to moderate thicknesses of mudcake occurs and in salty muds. In the focussed pad system disclosed in U.S. Pat. No. 3,132,298 (Doll, May 5, 1964), an apparatus is proposed which performs satisfactorily in relatively thick mudcakes. More recently, pad mounted electrode tools have been developed which provide a greater accuracy in obtaining $R_{XO}$, especially in thick muds. This new type of well logging tool has been referred to as a spherically focussed apparatus and is described in U.S. Pat. No. 3,760,260 (Schuster, Sept. 18, 1973). The spherically focussed system also has been proposed to determine the lateral thickness of a mudcake as well as $R_{XO}$. See, e.g., U.S. Pat. No. 3,973,188 (Attali et al., Aug. 3, 1976). All of the above-mentioned focussed microresistivity tools provide good $R_{XO}$ measurements under certain conditions, although none provide accurate $R_{XO}$ values under all conditions.

Wall-engaging pad devices also have found application in the determination of dip. Dip determining devices, known in the art as dipmeters, characteristically employ four pads which are applied against the borehole wall through two perpendicular diameters. Typically, each pad contains a transducer which conducts an investigation of formation characteristics immediately adjacent to the pad. See, e.g., U.S. Pat. No. 3,060,373 (Doll, Oct. 23, 1962). An individual pad may be provided with more than one electrode for the purpose of improving the demarcation between bed boundaries, see, e.g., Doll '373; enhancing dipmeter signals over noise, see, e.g., U.S. Pat. No. 3,521,154 (Maricelli, July 21, 1970); removing variations in speed caused by the so called "yo-yo" effect, see id.; or allowing more detailed correlation of signal features corresponding to vertical changes in formation characteristics, see, e.g., U.S. Pat. No. 4,251,773 (Cailliau et al., Feb. 17, 1981).

Dipmeter tools typically use passively focussed electrodes systems for constraining the surveying current to penetrate laterally for an appreciable distance into the adjacent earth formation. Typically, the focussing current electrode is a metallic surface which forms the major portion of the pad face. Centrally located in the pad face is a recess covered by a layer of insulating material. A survey current electrode is disposed in the recess and is separated from the metal pad proper by the insulating material. Survey current emitted from the survey electrode is caused to penetrate laterally into the adjacent earth formation by the current emitted from the focussing electrode. Additional focussing current may be emitted from the conductive surface of the dipmeter sonde body. Where more than one survey electrode is provided, the additional electrodes also are completely surrounded by the focussing electrode such that the respective survey current beams are focussed as described above by current emitting from the focussing electrode. The current return may be via a return electrode B located on the lower end of the multi-conductor cable as in the Doll '373 patent, or via a tool body member as in the Cailliau et al., patent.

In the prior art dipmeter systems, the survey current beams are focussed to penetrate relatively deeply into the earth formation in front of the pad member so that an appreciable portion of the electrical resistance experienced by the beam in the earth formations will be contributed by the uncontaminated portion of the formations, even though this zone is spaced from the borehole proper by a mudcake and an invaded zone. Moreover, the focussing and depth of penetration of all survey currents typically are essentially identical to facilitate dip determination and, in the case of a multiple electrode pad tool, to facilitate noise cancellation, speed correction, and/or more detailed correlation of features.

SUMMARY OF THE INVENTION

An object of the present invention, therefore, is to provide signals suitable for resistivity or conductivity determinations under a greater variety of invasion conditions than possible in the prior art. Another object of the present invention is to provide signals suitable for resistivity determinations of greater accuracy than possible in the prior art. Yet a further object of the present invention is to provide signals indicative of a radial profile suitable for determining the thickness and/or resistivity of one or a plurality of radial zones about the borehole.

A wall-engaging pad in accordance with the present invention comprises a face portion of electrically conductive material within which are disposed three or more current electrodes. The current from the current electrodes is provided with a suitable return. The current electrodes and face portion of the pad are arranged such that the current emitted from the current electrode nearest the return electrode is relatively weakly focussed or unfocussed and penetrates only a short distance while the current emitted from the current electrode farthest from the return electrode is relatively strongly focussed and penetrates a relatively great distance. Accordingly, the depth of investigation varies along the pad from on the order of a few millimeters to 20 centimeters under certain conditions. A plurality of individual measurements having respective graduated depths of investigation are made with the current electrodes. These measurements may be suitably processed to yield resistivity measurements.

The pad and sonde body cooperate to enhance the focussing of the survey current. Advantageously, the sonde body comprises two conductive sections spaced from each other by an insulating section. The pad and the sonde are maintained in a relative longitudinal position such that the focussing effect from the upper sonde section is relatively weak or negligible for the current emitted from the lower pad section and relatively strong for the current emitted from other sections of the pad.

Other objects, features, and characteristics of the invention will be apparent upon perusal of the following Detailed Description and claims, with reference to the accompanying Drawings, all of which are part of this Specification.

BRIEF DESCRIPTION OF THE DRAWINGS

In the drawings, wherein like reference characters indicate like parts:

FIG. 3 is a plan view of the face of one embodiment of the wall-engaging pad of FIG. 2;

FIG. 4 is a longitudinal cross-sectional view of the pad of FIG. 3, wherein associated pad electronics are shown schematically;

FIG. 7 is a flow diagram for explaining the use of signals produced by an embodiment of the present invention having more than three current electrodes;

FIG. 8 is a graph for explaining certain steps of the flow diagram of FIG. 7;

DETAILED DESCRIPTION OF THE PREFERRED EMBODIMENTS

Figure 2:
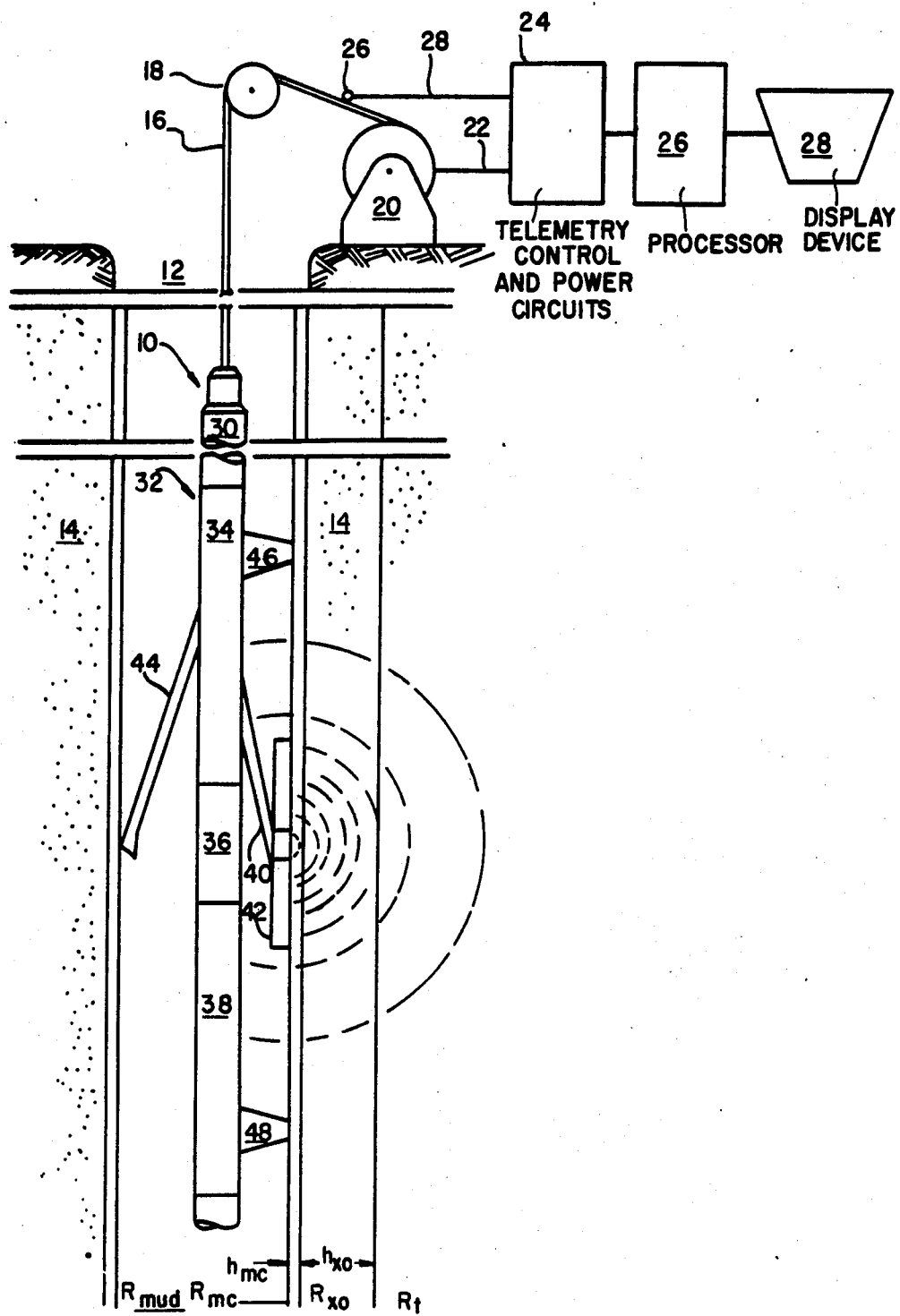
FIG. 2 is a plan view of one embodiment of a borehole logging tool in accordance with the present invention, wherein the earth formation traversed by the borehole is illustrated in cross-section and surface equipment is illustrated schematically.

One embodiment of a downhole investigating tool 10 is illustrated in FIG. 2. The tool 10 is disposed in a borehole 12 through earth formation 14. The borehole 12 is filled with a suitable drilling mud. The end of the tool 10 nearest the surface is connected by means of an armored multi-conductor cable 16 to suitable apparatus at the surface of the earth for raising and lowering the tool 10 through the borehole 12. The multi-conductor cable 16 passes over a sheave 18 and then to a suitable drum and wench mechanism 20. Electrical connection between the various conductors of the multi-conductor cable 16 and telemetry, control and power circuits 24 at the surface of the earth is accomplished by means of cable 22 and a suitable multi-element slip ring and brush contact assembly integral with the drum and wench mechanism 20. Cable depth information is provided by measurement wheel 26 and supplied via cable 28 to the telemetry, control and power circuits 24. Signals from tool 10 containing information on a characteristic of the formation 14 are supplied to processor 26 from the telemetry, control and power circuits 24. A log of the formation characteristic versus depth is produced by processor 26 and furnished to display device 28 for viewing by a user.

Resistivity Sonde and Pad Embodiments

The tool 10 comprises a number of individual sections, including several cartridges, indicated generally at 30, for supplying power to the tool 10 and controlling its operation, for preprocessing measurement signals, and for providing a telemetry interface between the downhole electronics and the cable 16; and a sonde indicated generally at 32 for providing measurement signals in accordance with the present invention. The sonde 32 comprises three longitudinally contiguous elongated sections 34, 36 and 38. Sections 34 and 38 are made of electrically conductive metal such as stainless steel. The section 36, which is disposed between conductive sonde sections 34 and 38, performs an insulating function. One suitable arrangement, which is described in the aforementioned Doll '373 patent, includes a sleeve of epoxy or viton resin disposed about central portion of the sonde between longitudinally projecting portions 34 and 38, which are insulatingly coupled to one another. The section 34 further supports arm 40 to which a wall-engaging pad or skid 42 is connected, and a backup arm 44. Backup arm 44 and arm 40 cooperate preferably although not necessarily to eccenter sonde 32 in the borehole 12. The sonde 32 and pad 42 are maintained substantially about a plane of symmetry passing through the center of each; by arm 40. Two friction shoes 46 and 48, respectively rigidly secured to sections 34 and 38 and angularly aligned together with pad 42 relative to the central axis of sonde 32 are provided to prevent contact of the sonde 32 with the wall of the borehole 12. Shoes 46 and 48 are suitably made of low friction material such as bronze to reduce friction during vertical displacement of tool 10 in borehole 12 during a logging operation.

A practical implementation of pad 42 is shown in detail in FIG. 3, which presents a frontal view of the pad 42, and FIG. 4, which presents a cross-sectional view of the pad 42 and associated electronics (schematically illustrated). The pad 42 is elongated in the direction of movement and its face is curved to match the curvature of the wall of borehole 12. The conically tapered upper face section 50 allows pad 42 to ride the wall of borehole 12 as the tool 10 traverses the borehole 12 toward the surface during a logging operation. An upper face section 54 along with the leading edge 50 of pad 42 function as a large focussing electrode. Pad face sections 50 and 54 are made of a good conducting material, such as bronze or soft iron, and are coupled to pad electronics 74 by cable 92. Within the face section 54 are longitudinally disposed three current electrodes 56a, 56b and 56c, each of which is mounted flush to face section 54 and is supported and electrically insulated from the face section 54 by respective insulating supports 62, 64 and 66. The current electrodes 56a, 56b and 56c, which may be made of stainless steel, are embedded in an electrically insulating material such as Araldite, for example, as shown at 76, 78 and 80. The current electrodes 56a, 56b and 56c are coupled to pad electronics 74 by respective electrical cables 68, 70 and 72. A lower face section comprising portions 52 and 82 of the pad 42 is made of an insulating material such as hard rubber or epoxy resin. Centrally disposed within the face section 82 is a return electrode 84, which is supported by an insulating support 86 made of a ceramic material and is embedded in an insulating material 88 such as Araldite. The return electrode 84 is connected to electronics 74 by cable 90. A conically tapered lower face section 52 trails pad 42 as the tool 10 traverses borehole 12 during a logging operation.

Typical dimensions for sonde 32 are as follows. Sonde sections 34, 36 and 38 respectively longitudinally measure 100 cm (39.37 in), 20 cm (7.9 in), and 100 cm (39.37 in). Sonde 32 is 10 cm (3.9 in) in diameter and nominally stands off the wall of borehole 12 by 5 cm (2 in) in the plane defined by the central axes of sonde 32 and pad 42. Typical dimensions for pad 42 are as follows. The current electrodes 56a–56c and 84 are 0.5 cm in diameter. Current electrodes 56a–56c are longitudinally spaced from the return electrode 84 by distances $L_a = 6.5$ cm, $L_b = 9.5$ cm, and $L_c = 12.5$ cm. Measured longitudinally, face sections 54 and 50 are 13 cm and face sections 82 and 52 are 13 cm. For a typical 8 inch borehole, face sections 54 and 82 have a characteristic radius of 4.5 inches with a lateral extension of ±25°.

Electronics suitable for operation of the pad 42 in association with sonde 32 are shown generally at 74 in FIG. 4. Signal generator 94 supplies electric current to the pad 42, and more specifically to the face section 54 and to the individual current electrodes 56a, 56b and 56c through respective measurement signal circuits 96a, 96b and 96c. The current is returned to signal generator 94 via the return electrode 84. The frequency of the current provided is 1,010 Hz.

Measurement signal circuit 96c is shown in detail in FIG. 4, measurement signal circuits 96b and 96a being substantially identical in design and generally represented thereby. Survey current from the signal generator 94 is provided to current electrode 56c through input transformer 98. Transformer 98 couples the signal to a variable-gain isolation preamplifier 100, whose gain and scaling parameters are controlled from the surface. The output from the variable-gain isolation preamplifier 100 is provided to a phase detector 102, which also receives the signal generated by signal generator 94. Phase detector 102 measures only the part of the measurement signal which is in-phase with the current supplied by the signal generator 94. The output from the phase detector 102 is sent to low-pass filter 104, which integrates the signal and produces a signal whose amplitude is characteristic of the amplitude of the detected measurement signal. This integrated measurement signal is provided to ratio circuit 106, which also receives the signal from signal generator 94 that has been integrated by integrator 108. The output from ratio circuit 106, which is indicative of an apparent resistivity as measured by the current electrode 56c, is amplified in amplifier 109 and provided to the surface as signal $R_c$. The input transformer 98 and preamplifier 100 typically are mounted on the back side of the associated pad. The rest of the electronics of the measurement circuit 96c may be contained in the electronics cartridge in tool 10, in the sonde 32, or mounted on the back of the pad 42.

Current from signal generator 94 also is provided to the sonde section 34 for improving the focussing, as described below. The current return to signal generator 94 is shown connected to sonde section 38, but the connection may be omitted without seriously degrading the measurement.

The operating principle of the sonde 32 is illustrated schematically in the right hand part of FIG. 2. The current emittted from the current electrodes 56a–56c and from the pad wall-engaging face section 54 and tapered face section 50 penetrates into the mud, mudcake, and/or formation in returning to the signal generator 94 through the return electrode 84 and sonde section 38. A current density distribution is established on face section 54, and hence current paths from the various portions of the face section 54 are established, which depend on the thickness and resistance of the mudcake and the invaded zone, and the resistance of the true formation. Current electrodes 56a, 56b and 56c advantageously are positioned in areas of face section 54 having progressively weakening current densities, which are associated with progressively greater depth of investigation. While the current electrodes 56a, 56b and 56c are arranged at regular intervals along the longitudinal center axis of the face section 54, neither condition is necessary, as will be made apparent below. The currents emitted from the current electrodes 56a–56c are monitored and returned to the surface as apparent resistances $R_a$, $R_b$ and $R_c$ respectively. The currents from the current electrodes 56a–56c are focussed from current emitted from face sections 50 and 54, and also from the sonde section 34 which constrains the survey currents essentially to a plane passing through the central axes of the sonde 32 and the pad 42. This particular arrangement advantageously minimizes beam spreading and improves focussing of the survey currents. Focussing is further improved by maintaining the body of sonde 32 within a small and essentially constant distance from pad 42 by rendering the sonde 32 eccentric, as shown.

Figure 5:
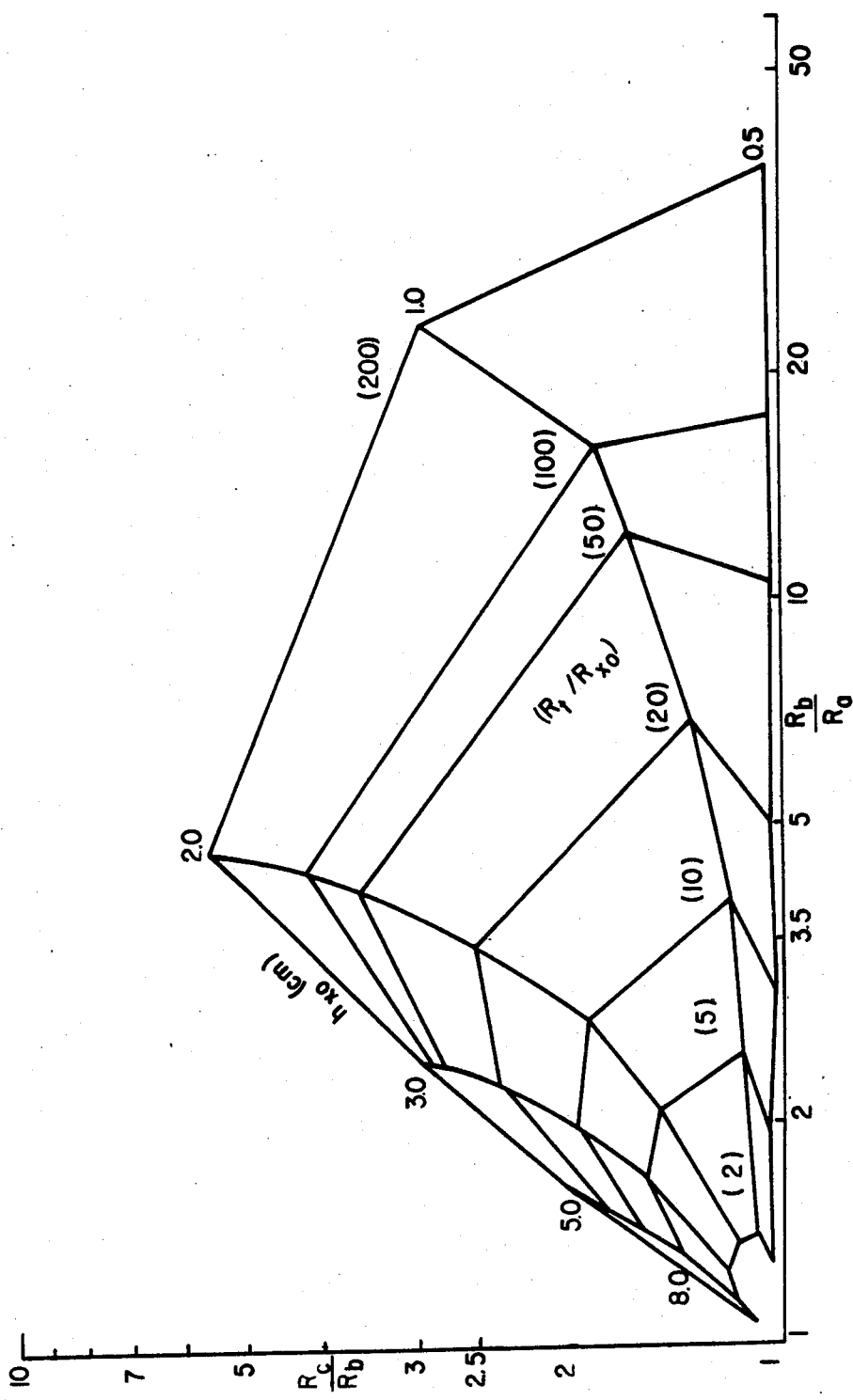
FIG. 5 is a graph for explaining the use of the signals produced in accordance with the present invention.

A graphical solution for the $R_{XO}$ value is illustrated in FIG. 5, which shows a cyclone chart having as its abscissa the ratio $R_b/R_a$ and as its ordinate the ratio $R_c/R_b$. The intersection of respective values for these two ratios yields values for $h_{XO}$ and $R_t/R_{XO}$. The values of $R_t/R_{XO}$ are shown paranthetically in FIG. 5 and run left to right from 2 to 200. The values of $h_{XO}$ run right to left from 0.5 to 8.0. For example, where sonde 32 indicates a $R_b/R_a$ ratio of 3.5 and a $R_c/R_b$ ratio of 2.5, the graph of FIG. 5 yields a mudcake thickness of 2.0 cm and an $R_t/R_{XO}$ ratio of 20. If the apparent deep resistivity is known, as by measurement with the deep-focussed electrical tool disclosed in U.S. Pat. No. 3,772,589 (Scholberg, Nov. 13, 1973) or other suitable electrical or induction tool, an approximate value of $R_{XO}$ results in straightforward fashion. A precise $R_{XO}$ and $R_t$ thereafter may be determined iteratively. Similarly, the conductivities correspond to zones of the formation may be determined.

Figure 1:
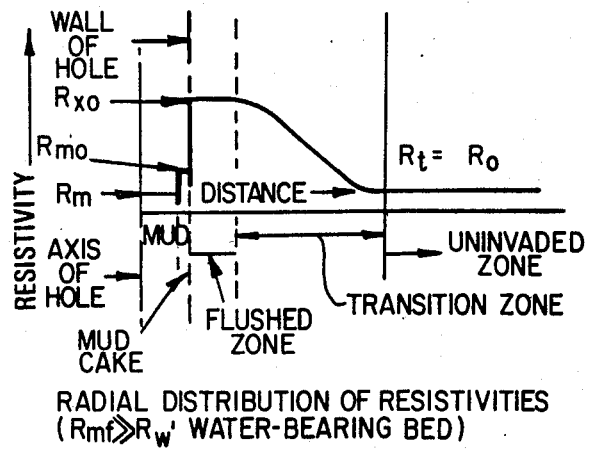
FIG. 1 (Prior Art) is a graph of the radial distribution of resistivities in a water bearing bed where $R_{mf}$ is significantly larger than $R_w$.
Figure 6:
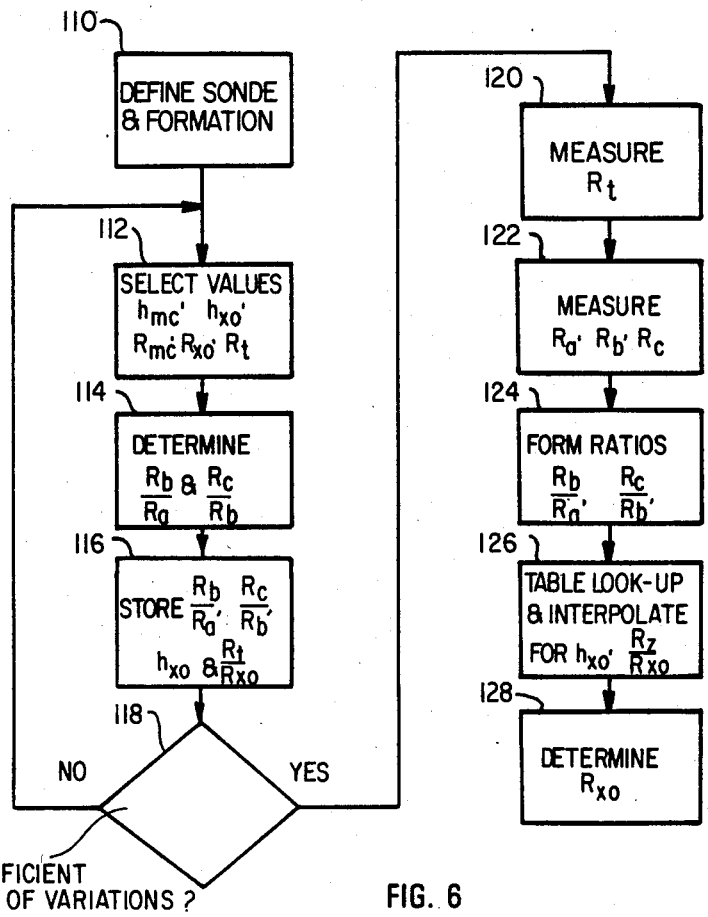
FIG. 6 is a flow diagram for explaining the creation and use of the graph of FIG. 5.

A procedure similar to that described above for forming and using the graph of FIG. 5 can be implemented in the form of an automatic table look-up scheme incorporated in the processor 26 of FIG. 2. The processor 26 may comprise, for example, any suitable general purpose digital computer. A simplified flow chart for programming the processor 26 to create, store and use a suitable look-up table is shown in FIG. 6.

The inital step 110 is to suitably define the problem, i.e., define the sonde and formation mathmatically, as depicted in FIG. 2. The sonde 32 is conceived as a low frequency device. Its mathematical representation is a boundary value problem in potential theory, which is a class of classical mathematical problems. The sonde 32 is conceived as a mandrel which is assumed centered on the rotational axis of a cylindrical coordinate system. Axially, the middle of the sonde is insulating (section 36) while the end sections contiguous thereto (sections 34 and 38) are conductive. Sonde 32 is surrounded by borehole fluid, i.e., drilling mud, which in turn is surrounded by concentric annuli of mudcake, an invaded zone, and undisturbed formation. The body of sonde 32 has a 5 cm radius, sonde sections 34 and 38 each are 100 cm long, and sonde section 36 is 20 cm long. The pad 42 is conceived as having an insulating midsection and conductive end sections. Pad 42 is urged against the wall of borehole 12. Sonde 32 and pad 42 are arranged symmetrically about a horizontal plane perpendicular to sonde 32 and passing through the midpoint of sonde 32 and pad 42. The length of pad 42 is selected to be 32 cm. The conductive faces of pad 42 include electrodes 0.5 cm wide and 3 cm apart, the electrodes of interest being the three electrodes on each conductive face nearest to the insulating section. The upper and lower sonde sections 34 and 38 are electrically connected to the upper and lower sections of the pad 42. This definition is satisfactory to represent an arrangement wherein either the pad lower section or the sonde lower section 38 serves as the current return, or the elongated current return is collapsed into a single return current electrode.

A set of values for $h_{mc}$, $h_{XO}$, $R_{mc}$, $R_{XO}$ and $R_t$ are selected in step 112, and synthetic ratios $R_b/R_a$ and $R_c/R_b$ are determined in step 114 by applying the finite element method, a well known numerical technique, to the value boundary problem. The values of $h_{XO}$ and $R_t/R_{XO}$ are stored in memory as a function of the synthetic ratios $R_b/R_a$ and $R_c/R_b$ in step 116. In step 18, a check is made to determine if a sufficient number of values for the h and R parameters have been selected to enable creation of a graph of desired resolution. If this has not been accomplished, a new discrete set of values for $h_{mc}$, $h_{XO}$, $R_{mc}$, $R_{XO}$ and $R_t$ is selected in step 112, and steps 114, 116 and 118 again are executed. If a sufficient number of values has been selected, the look-up table is considered complete. Then, a measurement of $R_t$ (resistivity of the uninvaded formation as measured by a deep investigation tool) and measurements of $R_a$, $R_b$ and $R_c$ are effected in steps 120 and 122. The processor 26 forms the ratios $R_b/R_a$ and $R_c/R_b$ in step 124, and consults the look-up table to find the corresponding values of $h_{XO}$ and $R_t/R_{XO}$ in step 126. If these values are not exactly obtainable, the processor 26 interpolates to determine the values of $h_{XO}$ and $R_t/R_{XO}$. Once a value for $R_t/R_{XO}$ is obtained, the value of $R_{XO}$ is determined in straightforward fashion in step 128.

The present invention also contemplates the use of more than three current electrodes for the purpose of providing either a more accurate $R_{XO}$ determination or for providing an invasion resistivity profile. An apparatus suitable for this purpose would be quite similar to the apparatus shown in FIGS. 2 and 3, except that additional current electrodes would be provided on the pad 42.

An alternative processing scheme for processing the measurement signals from more than three current electrodes is shown in FIG. 7, where the processor 26 would be programmed as follows. A sonde and formation configuration is defined in step 140. The configuration is as set forth in FIG. 2 and associated text, except that ten electrodes are assumed. Each electrode is 0.19 inches (0.5 cm) wide and 0.4 inches (0.16 cm) apart. The overall length of the emitting section of the pad is 7.95 inches. The separation between the return and the nearest emitting electrode is 4.0 inches. The mandrel, 4.0 inches in diameter, is 64 inches long and has an insulated portion 18 inches long.

For purposes of illustration, a simple problem with a moderate contrast is explained. The resistivity profile, which is defined in step 142, is assumed to be step-like as shown in FIG. 8. The borehole resistivity $R_m$ and the true formation resistivity $R_t$ are measured with other devices. Three concentric annuli of assumed thicknesses $h_1$, $h_2$ and $h_{XO}$ but of unknown resistivities R(1), R(2) and R(3), the independent variables, are defined. The first two annuli represent either a mudcake of two thicknesses or alternatively, standoff and mudcake. The third layer represents an invaded zone, of which the thickness is the known depth of investigation for a particular tool. This problem represents the practical situation of finding the $R_{XO}$ relevant to a particular tool when there is a varying standoff or mudcake. A more complex model representing a detailed invasion resistivity profile can be defined if desired.

$R_t$ and $R_m$ are measured in step 144 by known instruments such as the deep investigation electrical apparatus disclosed in the aforementioned Scholberg patent and a mud resistivity measuring device, to set the value of certain parameters as described above.

The tool 10 performs a measurement of ten apparent resistivities $R_a$–$R_j$ at a given depth in step 146. Initial values for R(1), R(2) and R(3) are assumed in step 148. Based on the assumed values, synthetic values of $R_a$–$R_j$ are computed using two dimensional finite element code, several suitable versions of which are commercially available. In addition, a residual function is produced based on these assumed estimates at step 150. The residual function is a vector formed by taking the difference, electrode by electrode, between the measured currents $R_a$–$R_j$ and the synthetic currents $R_a$–$R_j$.

The residual function produced at step 150 is minimized at step 152 by application of the Levenberg-Marquardt algorithm, which is a well-known proceedure for minimizing a function of several independent variables. The algorithm uses finite differences to determine changes to the estimates for the next iteration and to the next minimization of the residual function. Convergence is tested in step 154. If the algorithm has not converged, the R(1), R(2), and R(3) estimates are changed in accordance with step 152, and step 150 is returned to for the production of new synthetic $R_a$–$R_j$ and a new residual function. Steps 150, 152, 154, and 156 are iteratively executed until convergence occurs, in which case control is provided to step 158 which records the value of $R_{XO}$ and, if desired, R(1) and R(2) for the given depth.

Figure 9:
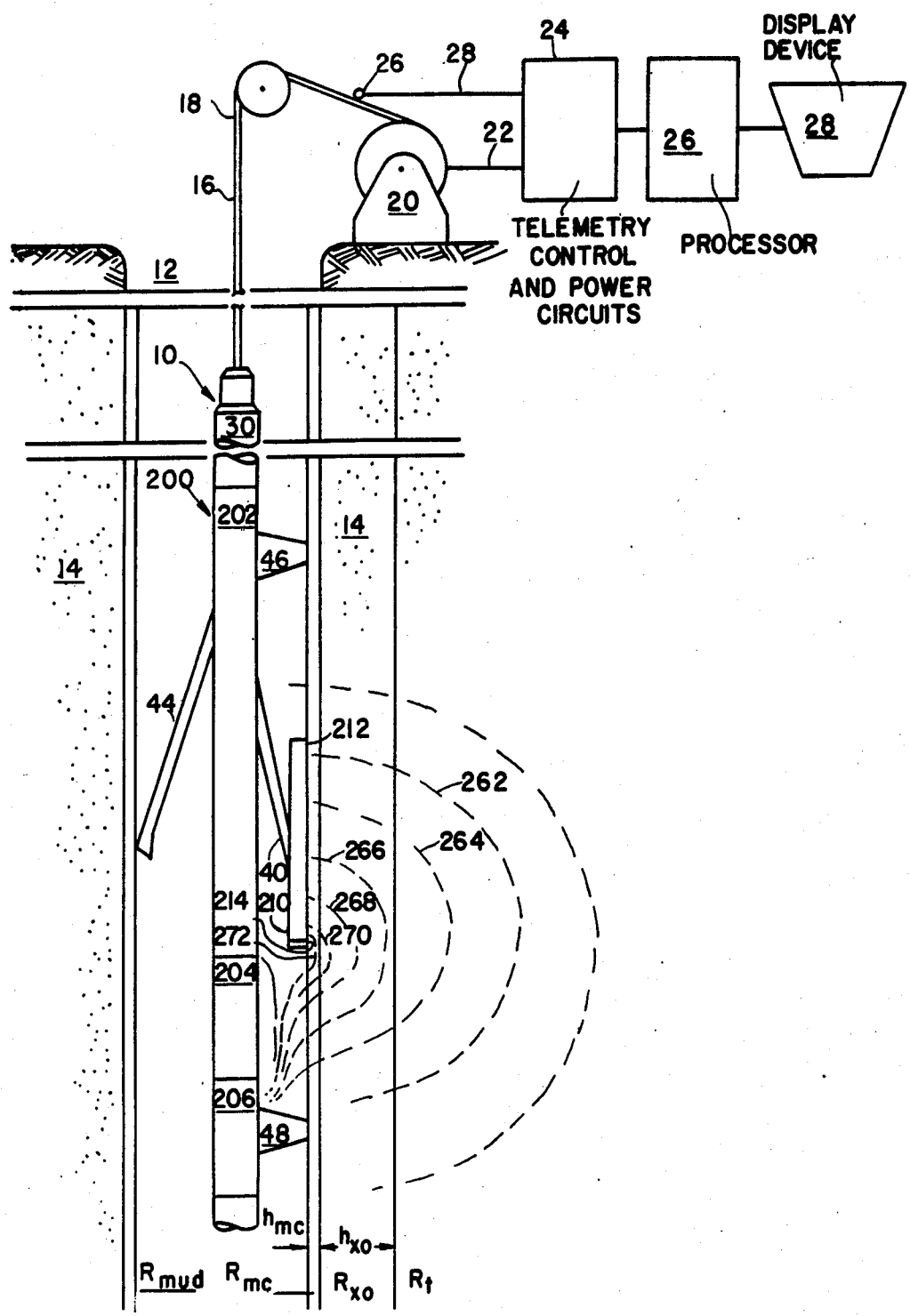
FIG. 9 is a plan view of another embodiment of a borehole logging tool in accordance with the present invention, wherein the earth formation traversed by the borehole is illustrated in cross-section and surface equipment is illustrated schematically.

Referring now to FIG. 9, another embodiment of the invention is shown which significantly increases the ratio of depth of investigation to pad length. Satisfactory depth of investigation is achieved with a short pad, which can be easily and reliably applied to a borehole wall. A sonde indicated generally at 200 provides measurement signals in accordance with the present invention. The sonde 200 comprises three longitudinally contiguous elongated sections 202, 204 and 206. Sections 202 and 206 are made of electrically conductive metal such as stainless steel. Section 204, which is disposed between conductive sonde sections 202 and 206, performs an insulating function. A suitable arrangement is discussed above in the context of sonde section 36. The section 202 supports arm 40 to which pad 210 is connected, and a backup arm 44. Backup arm 44 and arm 40 cooperate preferably to eccenter sonde 200 in the borehole 12. Pad 210 comprises a focussing face portion 212 and an insulating portion 214, as explained in detail below. Two friction shoes 46 and 48 are provided as described above.

Figures 10, 13:
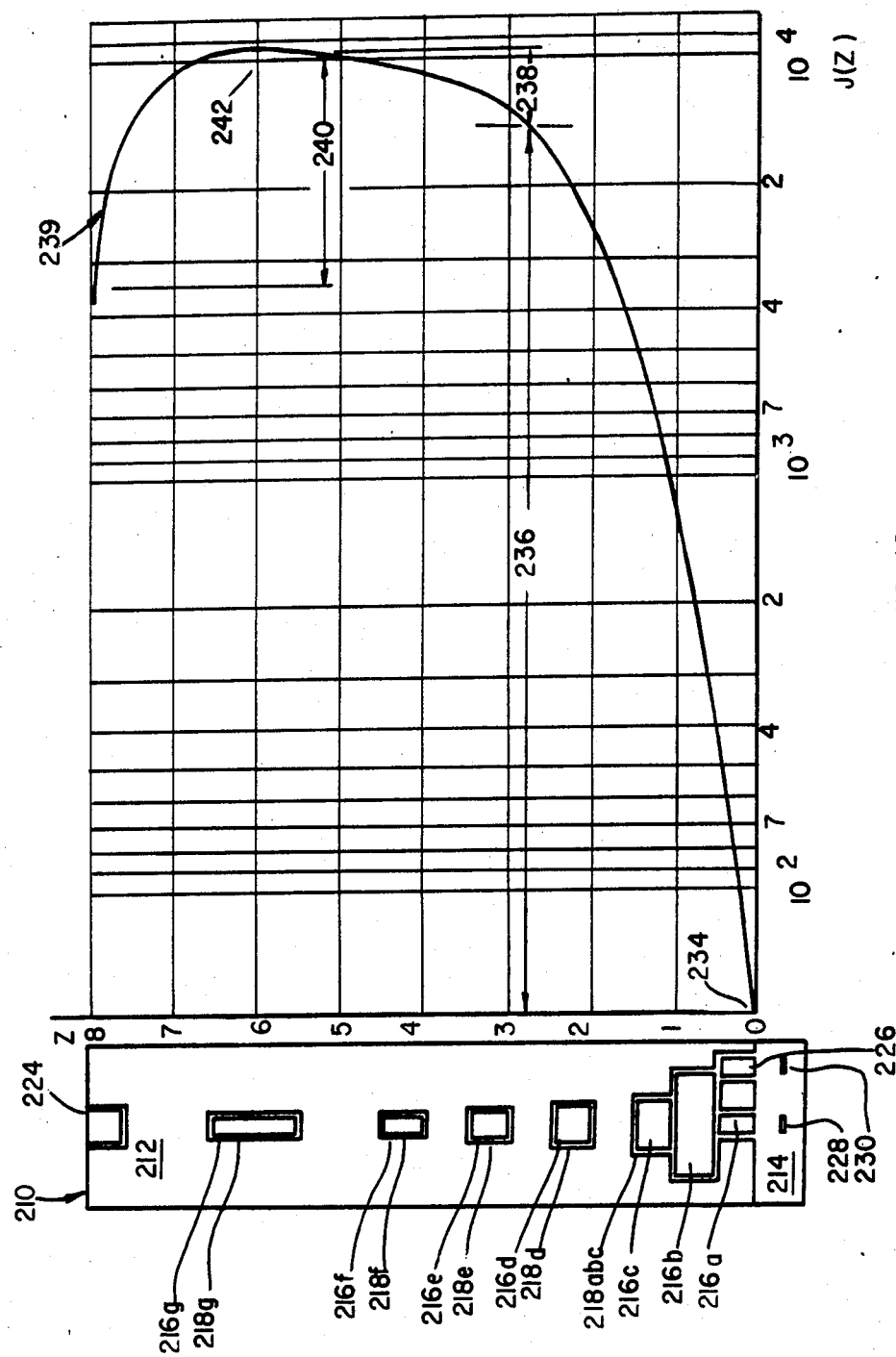
FIG. 10 is a plan view of an embodiment of the wall-engaging pad of FIG. 9.
FIG. 13 is a graph for explaining the current density on the face of the pad of in FIG. 10.
Figures 11, 12:
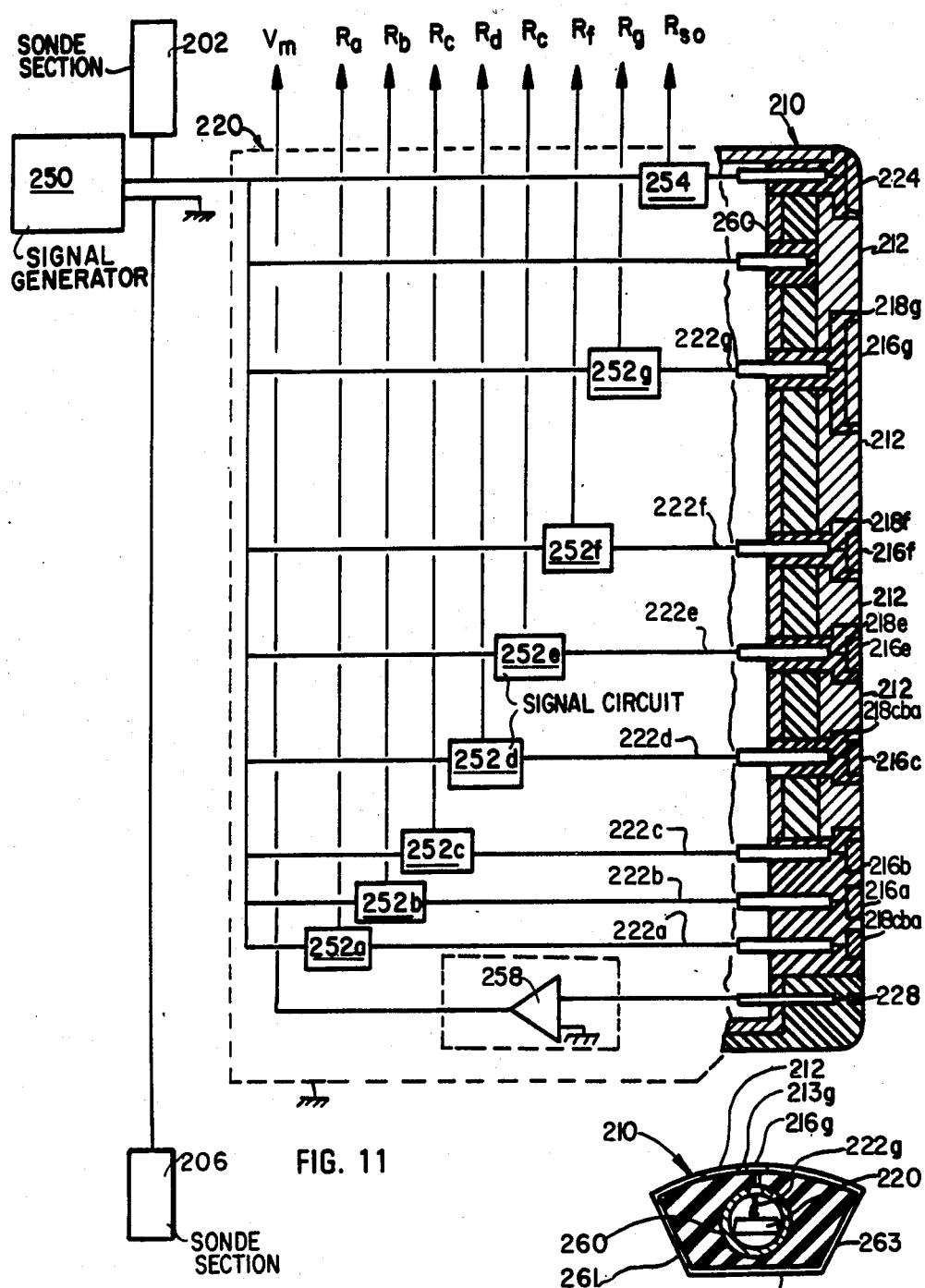
FIG. 11 is a longitudinal cross-sectional view of the pad of FIG. 10, wherein associated pad electronics are shown schematically.
FIG. 12 is a lateral cross-sectional view of the pad of FIG. 10.

A particularly advantageous pad arrangement is shown in detail in FIG. 10, which presents a frontal view of pad 210, and FIGS. 11 and 12, which present cross-sectional views of pad 210 and associated electronics (schematically illustrated in FIG. 11 and indicated generally at 220). Pad 210 may have conically tapered sections, as described above, and is elongated in the direction of movement. The metal face 212 of pad 110 is curved to match the curvature of the wall of borehole 12. Within the face section 212 are longitudinally disposed seven current electrodes 216a–216g, which are mounted flush to face section 212 and are supported and electrically insulated from the face section 212 by respective ceramic elements 218abc and 218d-g. The current electrodes 216a–216g are coupled to pad electronics 220 by respective cables 222a–222g. The face section 212 includes two additional current electrodes 224 and 226, and the face section 214 contains two voltage electrodes 228 and 230. The purpose of these electrodes is described below.

Typical dimensions for sonde 200 are as follows. Sonde sections 202, 204 and 206 respectively longitudinally measure 30 inches, 15 inches, and 15 inches. Sonde 200 is 4 inches in diameter and nominally stands off the wall of borehole 12 by 0.75 inches in the plane defined by the central axes of sonde 200 and pad 210. Typical dimensions for pad 210 are as follows. Measured longitudinally, face sections 212 and 214 measure 8 inches and 0.6 inches respectively. For a typical 8 inch borehole, face sections 212 and 214 have a characteristic radius of 4.5 inches with a lateral extension of ±25°.

Preferably, pad 210 is maintained in a substantially fixed longitudinal relationship relative to the sections 202, 204 and 206 of sonde 200. Optimal focussing is achieved if the edge of pad insulating portion 214 nearest the sonde section 206 lies in a plane transversely intersecting sonde section 202 within approximately 2 cm of the juncture of sonde sections 202 and 204, although this distance is not critical. A distance of 1 cm has been selected for the embodient of FIG. 9.

The described arrangement provides current lines having a depth of penetration ranging from a few millimeters to about 20 cm. This is obtained even though the length of pad 210 is small, about 20 cm. Moreover the pad 200 is highly wear-resistant as its wall-engaging face is essentially made of metal.

The dimensions and arrangement of current electrodes 216a–216g are determined in accordance with the distribution of current density on face section 212, which in turn is related to the depth of investigation of the survey currents emitted from the current electrodes 216a–216g. The curve 239 shown in FIG. 13 in association with the pad 210 illustrates the density distribution $J(z)$. The abscissa represents in logarithmic scale the current density $J(z)$, and the ordinate represents the longitudinal position $z$ on the face section 212. The graph of FIG. 13, which is exemplary, is based on and $R_{XO}/R_{mc}=100$ and $h_{mc}=0.5$ inches.

Depth of investigation of the current deepens with weakening current density. Depth of investigation is minimum at the lower end of the face section 212, indicated in FIG. 13 at 234. It can be seen that from the minimum 234, the depth of investigation exhibits a rapid increase, indicated generally by 236, as the sonde section 202 and face section 212 begin to be effective in focussing the current along the longitudinal axis of pad 210. A slower increase is observed until a maximum 242 located in the upper third of the pad is reached, as indicated generally by 238. Beyond maximum 242, the proximity with the upper edge 31 causes the current density to increase and therefore the depth of investigation to decrease, as indicated generally by 240.

The seven current electrodes 216a–216g are arranged so as to provide resistivity or conductivity measurements with different depths of investigation. The first electrode 216a is adjacent the insulating section 214. The second current electrode 216b is separated from the first current electrode 216a by a portion of the insulating element 218abc, and the third current electrode 216c is separated from the second current electrode 216b by another portion of the insulating element 218abc. The dense arrangement of current electrodes 216a–216c is a result of the rapid variation of the depth of investigation in section 236 of the curve 239. The three current electrodes 216a–216c are located in substantially the lower quarter of the face section 212. The three current electrodes 216d–216f are spaced at greater intervals to comply with the relatively slower variation in section 238 of the curve 239. In the section 240 of curve 239 including the maximum 242, which corresponds to about the upper third of the face section 212, the variation about the maximum 242 is small and a single current electrode, namely electrode 216g is sufficient.

As shown in FIG. 10, the current electrodes 216b–216g have individual characteristics that are defined to optimize the signal-to-noise ratio of the respective measurements. Specifically the lengths and widths of the respective current electrodes 216a–216g are selected so as to maintain an optional surface area to maximize the signal-to-noise ratio of the respective measurements. The respective characteristics of the electrodes 216a–216g are based on the longitudinal variation in the current density along face section 212, as illustrated by the curve $J(z)$, and the lateral variation of the current density across face section 212. In the positions along the longitudinal axis of face section 212 for which the current density is high, the current density also remains stable over much of the width of the pad and significantly increases only near the lateral edges. In the positions of low current density, however, the area abcut the longitudinal axis of face section 212 over which the current density remains substantially stable is relatively narrow. The width of each of the current electrodes 216a–216g is defined so that the lateral variation of the current density from the center of the electrode (i.e., of face section 212) to the lateral ends of the electrode, is kept within a given range of, e.g., 15%. Since the current density decreases with increasing distance from the section 214, the current electrodes 216b–216g have respective widths which decrease with increasing distance from the insulating section 214. Current electrode 216a does not conform to this design rule for reasons described below. Thus, current electrode 216b adjacent current electrode 216a has the largest width, equal to more than one-half the width of the face section 212. The current electrode 216 adjacent the current electrode 216b has a much smaller width, about one-half that of current electrode 216b. The current electrode 216d is narrower than current electrode 216c and so on until electrode 216g, which is the narrowest. The lengths of current electrodes 216a–216g advantageously are selected to be as great as possible, limited by the requirement that the variation of the current density for each electrode from one longitudinal end thereof to the other is less than a given amount, e.g., less than 15%. In view of the foregoing, the evolution pattern for the length of the current electrodes 216b–216g preferably is the reverse of the pattern defined for the width. Current electrode 216b is shortest, and electrode length increases up to current electrode 216g, which is longest.

The current electrode 224 adjacent the upper edge of face section 212 is located in an area of relatively strong current density and provides a measurement corresponding to a depth of investigation less than the maximum 242. The measurement made with current electrode 224 is responsive to the engagement of the pad with the wall of borehole 12 in the area of the upper edge of the pad 210. Where the pad 210 stands off from the wall of borehole 12, current must flow through the drilling mud, causing a significant change in the apparent resistivity measured by current electrode 224. The measurement provided by the current electrode 224 thus permits contact of the pad 210 with the wall of borehole 12 to be monitored.

Current electrode 216a departs from the design rule described for current electrodes 216b–216g. While current electrode 216a advantageously may have a width nearly equal to the width of face section 212 in accordance with the design rule, the region of face section 212 may advantageously be used to monitor lower pad contact and provide a measurement under poor borehole conditions. Accordingly, current electrode 226 is provided laterally of current electrode 216a, whose width is small to accomodate current electrode 226. The lateral current electrode 226 provides a measurement indicative of the resistivity at a very small depth, of the order of a few millimeters, which essentially is identical with the measurement provided by current electrode 216a. It will be appreciated that the current density in the region of face section 212 in which current electrodes 216a and 226 are disposed remains stable over almost the entire width of the pad. Accordingly the current electrodes 216a and 226 should under good borehole conditions provide quite similar measurements, even though the respective very shallow measurements are extremely sensitive to the contact of the face section 212 with the wall of borehole 12. If one of the current electrodes 216a or 226 does not engage the wall of borehole 12, the measurement provided by the electrode that stands off will be dominated by the resistivity $R_m$ of the mud, which is usually much smaller than that of the mudcake and flushed zone. One of the current electrodes 216a and 226 will remain in contact with the wall of borehole 12 under certain circumstances, however, as for example when the curvatures of the face section 212 and the wall of borehole 12 do not agree. For example, if the curvature of the wall of borehole 12 is larger than that of the face section 212, the central area of the face section 212 will not engage the wall. Under such circumstances the lateral current electrode 226 will engage the wall of borehole 12, and a satisfactory measurement is achieved despite the deficiency of the measurement from the central current electrode 216a. Moreover, a significant difference between the respective measurements of current electrodes 216a and 226 will be indicative of an imperfect contact. The comparison between these two measurements will allow the circumferential application of the pad 210 to the wall of the borehole 12 to be monitored.

The small width of current electrodes 216a and 226 will not render unacceptable the signal-to-noise ratio of the measurement signals obtained therefrom because the current density is very large in the lower region of face section 212. Additional lateral electrodes could be provided in other regions of face section 212 where the current density is high. For instance, a second lateral current electrode could be disposed at the level of current electrode 216b, and a third lateral current electrode could be disposed at the level of current electrode 216c.

In order to reduce the influence of mud resistivity on the measurements furnished by current electrodes 216a and 226, voltage measuring electrodes 228 and 230 are disposed in the insulating face section 214 and respectively associated with the current electrodes 216a and 226. The electrodes 228 and 230 are aligned in the longitudinal direction of the pad 210 respectively with current electrodes 216a and 226 and in the lateral center of insulating face section 214.

The voltage electrodes 228 and 230 provide respective voltage measurements which allows correction for the influence of mud to be effected. Assume $I_a$ is the current emitted from current electrode 216a and V the voltage applied to face section 212 and each of the current electrodes 216a–216g, 224 and 226. The apparent resistivity measurement from electrode 216a is:

$$R_a = k_a (V/I_a); \tag{1}$$

$k_a$ being a constant coefficient. The mud correction comprises substituting for this expression the following:

$$R_a^* = k_a (V - V_m)/I_a; \tag{2}$$

where $V_m$ is the voltage measurement taken from voltage electrode 228. The correction is carried out at least for the very shallow measurements from current electrodes 216a and 226. The correction can be effected for the measurements from other current electrodes, if desired.

Electronics suitable for operation of the pad 210 in association with sonde 200 are shown generally at 220 in FIG. 11. Signal generator 250, having characteristics identical to signal generator 94, supplies electric current to face section 212 and to the individual current electrodes 216a–216g, 224, and 226 (not shown) through respective measurement signal circuits 252a–252g, 254 and 256 (not shown). Each of the measurement signal circuits 252a–252g, 254 and 256 essentially is identical to measurement signal circuit 96c shown in FIG. 4, with the associated input transformer and preamplifier preferably mounted inside a pressure-resistant metal tube 260 contained within the body of pad 210 (FIG. 12). Pad 210 suitably includes conductive metal lateral edges 261 and 263 and a conductive metal back 265, which minimize the influence of variation in the distance between sonde 200 and pad 210. Space within the body of pad 210 may be filled with hard rubber, epoxy or oil. Current is returned to signal generator 250 via sonde section 206. Additional focussing current is supplied to sonde section 202 and also returned via sonde section 206. The voltage electrode 228 is coupled to preamplifier 258, which furnishes the value of parameter $V_m$. Voltage electrode 260 and associated electronics would be identical, and are not shown in the interest of clarity.

The operating principle of the sonde 200 is illustrated schematically in the right hand part of FIG. 9. While quite similar in principle to sonde 32 (FIG. 2), sonde 200 has a greater depth of investigation. The current paths 262 and 264 from the upper region of face section 212 are strongly focussed and penetrate deeply into the formation substantially through the invaded zone. The focussing is moderate in the central region of face section 212, as indicated by current paths 266, 268, and 270. Current from the lower region of the face section 212 is very weakly focussed and has very little penetration, as shown by current path 272. The plurality of apparent resistivity measurements obtained from current electrodes 216a–216g and 226, corrected by the measurements obtained by voltage electrodes 228 and 230, are processed in processor 26 substantially as described above, to yield $R_{XO}$ or a resistivity profile, as desired.

Arm Mechanism

Figure 14:
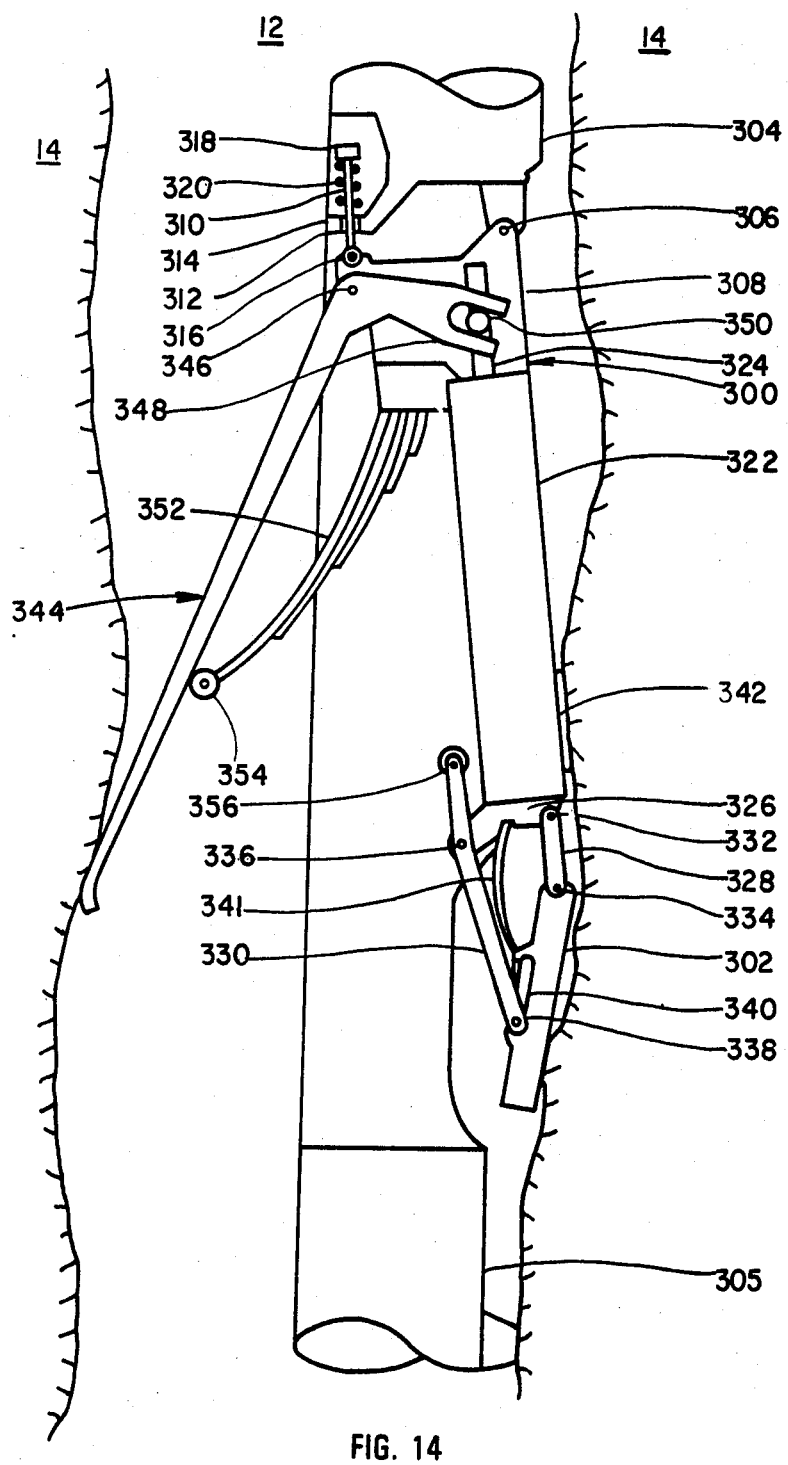
FIG. 14 is a plan view of an arm mechanism in accordance with the present invention for eccentering the resistivity sonde and maintaining the pad in engagement with the borehole wall, wherein the earth formation traversed by the borehole is shown in cross-section and the mechanism is shown in the pad extension mode.
Figures 15, 16:
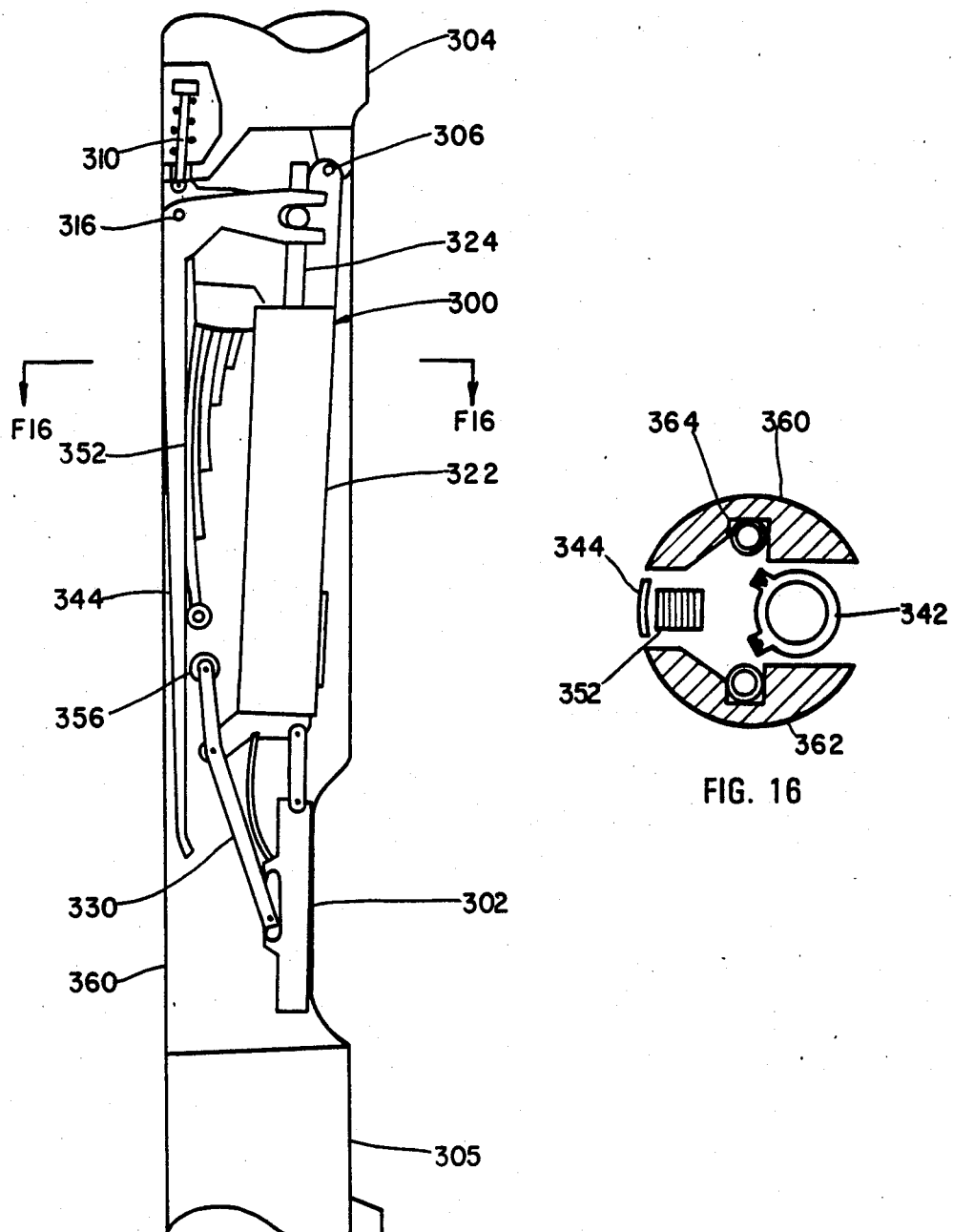
FIG. 15 is a plan view of the arm mechanism of FIG. 14 shown in the pad retraction mode.
FIG. 16 is a lateral cross-sectional view of the mechanism of FIG. 15, taken along section F16—F16.

Preferably, the longitudinal positions of the sonde 32 and pad 42 and sonde 200 and pad 210 are to be maintained stable relative to one another. An arm mechanism particularly suitable for the various sonde embodiments described herein is shown in FIGS. 14–16. The arm mechanism, which can be accommodated in a relatively short portion of the body of a sonde while achieving the desired stability and eccentering by use of a long pad-supporting arm, also is suitable for use generally in other types of eccentric sondes.

The arrangement of the arm mechanism in the pad extension mode is shown in FIG. 14. The arm 300 at the end of which is mounted pad 302, which may be pad 42 or 210, for example, is pivotally connected to the upper sonde body part 304 by a pivot 306. The arm 300 has an integral extension 308 on the end farthest from the pad 302. The extension 308 is resiliently connected to the upper sonde body part 304 by a rod 310 passing through a hole 312 formed in a wall portion 314 rigid with the sonde body part 304. The rod 310 carries at one end a pivot 316 and is thus allowed to pivot with respect to the arm 300. At its other end, the rod 310 has a stop collar 318 on which bears a compression spring 320, the other end of which engages the wall portion 314 rigid with the upper body part 304.

The arm 300 is essentially constituted by the body 322 of an simple-action actuator controlled from the surface equipment. The actuator is operable to displace an actuating rod 324 projecting from the actuator adjacent the pivot 306. The actuator can be a simple-action hydraulic or electric jack, the rod 324 being secured to the movable member of the jack. Such devices are well known.

The pad 302 is connected to an end portion 326, which is rigid with the actuator body 322, by means of two links 328 and 330. The upper link 328 is articulated on the end portion 326 by a pivot 332 and on the upper end of the pad 302 by a pivot 334. The lower link 330 is articulated by a pivot 336 on the end portion 326, and its end 338 is slidable in an elongate slit 340 formed on the rear of the pad 300. A leaf spring 341 is secured on the end portion 326 and connected to approximately the middle of the rear of pad 302. Spring 341 exerts a resilient force that acts to engage the pad 302 with the wall of borehole 12. Since the end of the link 330 is slidable with respect to the pad 302, the latter is allowed a limited pivotal displacement about the pivot 334 and hence an angular offset with respect to the axis of the sonde body, so as to optimally adapt to the profile of the wall of borehole 12. Moreover, the actuator body 322 carries on its outer side a protruding member 342 for engagement with the wall of borehole 12.

The backup arm 344 is pivotally connected to the extension 308 of the arm 300 by a pivot 346 and includes beyond the pivot 346 a forked extension 348 slidably engaging a peg 350 secured to the actuating rod 324. A leaf spring 352 secured to the extension 308 of arm 300 has at its end a roller 354 engaging the internal surface of the backup arm 344, so that the backup arm 344 is resiliently biased away from the sonde body.

The lower portion of the sonde body part 304 is designed to accommodate the pad 302, the arm 300 and the backup arm 344 when retracted, as shown in FIGS. 15 and 16. The lower portion of sonde body part 304 comprises two walls 360 and 362 spaced from each other and having inner recesses for receiving conductors 364.

In the position of FIG. 14 where the pad 302 engages the wall of borehole 12 for carrying out measurements, the actuator 322 is not operative and the actuating rod 324 is freely movable with respect to the actuator body 322. The position of the rod 324 is related to the angular position of the backup arm 344 which is resiliently loaded into engagement with the borehole wall, and therefore indicative of the diameter of the borehole 12. A signal indicative of this diameter is produced by a displacement detector (not shown) associated with the rod 324, for instance a potentiometer. Due to the resilient connection between the arm 300 and the sonde body provided by the rod 310, the sonde body is subjected to a resilient force that tends to eccentralize the same with respect to the axis of the borehole 12 and thereby to maintain the distance between the sonde body and the pad 302 at an essentially constant, low value.

When it is desired to retract the arm 302 and the backup arm 344, the actuator 322 is operated. The actuating rod 324 is displaced to pivot the backup arm 344 against the action of the spring 352. The backup arm 344 pivots inwardly until it abuts a roller 366 mounted at the end of an extension of the lower link 330. Once the backup arm has reached this abutment position, the continuing displacement of the rod 324 causes the arm 300 to be angularly moved inwardly about pivot 306 until the position of FIG. 15 is attained.

While the invention has been described with reference to particular embodiments, it is to be appreciated that the embodiments are illustrative and that the invention is not intended to be limited to only the disclosed embodiments. Variations within the spirit and scope of the invention will occur to those skilled in the art. Accordingly, variation in these and other such features are contemplated and are within the scope of the present invention.

What is claimed is:

1. An apparatus for providing signals indicative of the electrical resistivity of a subsurface formation traversed by a borehole, comprising:
   an elongate sonde body adapted for longitudinal movement though said borehole, said body including a first electrically conductive body section operative to emit electrical current, an insulating section, and a second electrically conductive body section in endwise connection;
   a pad connected to said sonde body and having a borehole wall engaging face of conductive material, said pad including at least three current electrodes disposed at different longitudinal locations along said conductive face, said electrodes being operative to emit survey current;
   means electrically connected to said conductive face and to said first conductive body section for maintaining said conductive face and said first conductive body section at substantially equal electrical potential;
   electrical conductor means carried by said apparatus for returning current emitted from said first conductive body section and said conductive face; and
   means connected to said pad and to said sonde body for urging said conductive face into engagement with the wall of a borehole and for maintaining said conductive face at least partially within a current field emitted from said conductive body section.

2. An apparatus as in claim 1 further comprising means for maintaining said sonde body substantially at a preselected distance from the area of the borehole wall engaged by said face.

3. An apparatus as in claim 1 wherein said current electrodes are centered on the longitudinal axis of said conductive face.

4. An apparatus as in claim 3 wherein one of said current electrodes is substantially centered on said conductive face and another of said current electrodes is located adjacent the edge of said conductive face nearest said current return means.

5. An apparatus for providing signals indicative of the electrical resistivity of a subsurface formation traversed by a borehole, comprising:
- an elongated sonde body adapted for longitudinal movement through said borehole comprising an insulating body section, a conductive focusing body section extending longitudinally from one end of said insulating body section, and a conductive return body section extending longitudinally from the other end of said insulating body section;
- a borehole wall engaging member having a borehole wall engaging face comprising an insulating face section having a current return electrode located therein, and a conductive focusing face section having at least three longitudinally arranged current electrodes located in respective areas thereon, said electrodes having unequal current densities and being electrically separate from said conductive focusing face section;
- means carried by said sonde body and electrically connected to said electrodes for furnishing survey current to said electrodes;
- means carried by said sonde body and electrically connected to said focusing body section and focusing face section for furnishing focusing current to said focusing body section and said focusing face section;
- means for returning said focusing current and said survey current through said return body section and said return electrode; and
- means operatively disposed between said sonde body and said wall engaging member for urging said wall engaging member against the borehole wall while maintaining said focusing face section subject to the focusing field of said focusing body section and said insulating face section subject to the return field of said return body section.

6. An apparatus for providing signals indicative of electrical conductivity in a formation traversed by a borehole, comprising:
- an elongated sonde body adapted for longitudinal movement through said borehole;
- a borehole wall engaging member having a borehole wall engaging face, said face comprising:
    - a conductive focussing section; and
    - at least three longitudinally arranged current electrodes electrically insulated from said conductive focussing section and located in respective areas of said focussing face section having unequal current densities, said focussing face section being operative to focus current emitted by said electrodes;
- a current return carried by said sonde body; and
- means operatively disposed between said sonde body and said wall engaging member for urging said wall engaging member against the borehole wall.

7. An apparatus as in claim 6 wherein: said sonde body comprises:
- an insulating body section;
- a conductive focussing section contiguous to said insulating body section and extending longitudinally from one end thereof; and
- a conductive return section contiguous to said insulating body section and extending longitudinally from the other end thereof; and
- said urging means comprises means for maintaining said current electrodes subject in respective different degrees to a focussing field maintained by said focussing body section.

8. A well logging method for determining the electrical resistivity of a subsurface formation traversed by a borehole, comprising the steps of
- lowering into the borehole a sonde having an elongate body having first and second sections axially separated by an insulating section and a measuring pad with a conductive face having a plurality of electrically isolated electrodes at different axial locations therealong;
- moving said sonde through the borehole with the conductive face of said pad in engagement with the borehole wall;
- applying a first potential to said conductive face;
- applying a potential substantially equal to said first potential between said first conductive section and said second conductive section;
- maintaining the axial position of said pad relative to said first conductive section such that the current flowing from an area of said conductive face nearest said second conductive body section is substantially unfocused, while current flowing from other areas of said conductive face is focused by said first conductive section; and
- meansuring the current flow from said plurality of electrodes said different axial locations.

9. A method as in claim 8 further comprising the steps of:
- moving said sonde through the borehole with the conductive face of said pad in engagement with the borehole wall, said pad further having a wall engaging face portion of insulating material contiguous to said conductive face, said insulating face portion having a return electrode located thereon; and
- applying a second potential unequal to said first potential to said retun electrode.

10. A method as in claim 9 further comprising the step of applying a potential substantially equal to said second potential to said second conductive body section.

11. A method for providing signals indicative of the electrical resistivity of a subsurface formation traversed by a borehole, comprising the steps of:
- emitting survey currents toward said formation from at least three different longitudinal locations within said borehole adjacent to the wall of the borehole;
- emitting additional current toward said formation from locations adjacent to both said at least three locations and to the wall of the borehole to differently focus said survey currents;
- receiving said emitted survey and focusing currents at a location longitudinally spaced from said other locations;
- measuring said survey currents at said at least three locations;
- generating signals indicative of the electrical resistivity of said formation from said received survey currents.

12. A method as in claim 11 further comprising the step of emitting additional current from locations in the borehole to focus said survey currents essentially in a radial plane intersecting the wall locations at which said survey currents are emitted.

13. A method as in claim 11 wherein said current receiving stepcomprises the step of receiving said emitted survey and focusing currents at a location within said borehole next to said borehole wall, said longitudinal locations being at respectively greater axial distances from said receiving location.

14. A method as in claim 11 wherein said current receiving step comprises the step of receiving said emitted survey and focusing currents at locations within said borehole and next to said borehole wall, said longitudinal locations being at respectively greater axial distances from said receiving locations.

* * * * *